Figure 1:
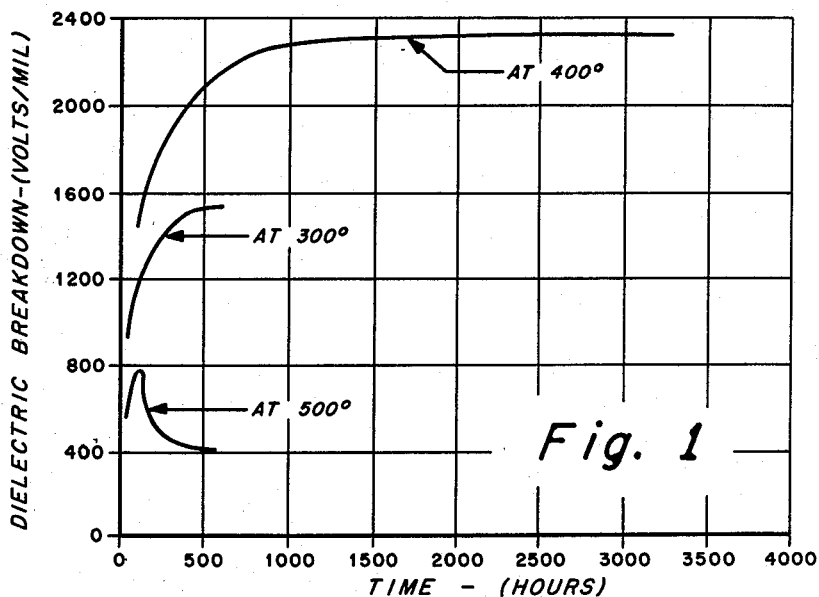

INVENTORS
ALVIN R. SALTZMAN
JACK M. ROSEN

United States Patent Office 2,923,689
Patented Feb. 2, 1960

2,923,689

ELECTROMAGNETIC WAVE ENERGY ABSORBING MATERIAL

Alvin R. Saltzman, Willow Grove, and Jack M. Rosen, Levittown, Pa.

Original application August 31, 1953, Serial No. 377,745, now Patent No. 2,837,720, dated June 3, 1958. Divided and this application December 6, 1956, Serial No. 626,785

4 Claims. (Cl. 252—507)

(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of applicant's co-pending application Serial No. 466,461, entitled "Electro-magnetic Wave Energy Absorbing Material," filed in the United States Patent Office on November 2, 1954, now abandoned, a divisional application of applicant's co-pending application Serial No. 377,745, entitled "Attenuation Device and Material Therefor," filed in the United States Patent Office on August 31, 1953, and issued June 3, 1958 as U.S. Patent No. 2,837,720.

The wide use of dummy loads and similar attenuating devices in connection with high frequency wave transmission emphasizes the importance of an efficient energy absorbing material for use in such dummy loads. A common difficulty attendant upon the use of various known types of dummy loads and related devices is predicated upon the fact that wave energy reflection is produced by the presence of the energy absorbing material used with typical dummy load installations. This objectional reflection occurs when the wave impedance of the material is not purely resistive but has a reactive component. As a consequence, dissipation by a dummy load of either the electric field energy or the magnetic field energy of a translated wave produces a reactive component in the otherwise purely resistive impedances of the wave propagation path which is proportional in amount to the rate of attenuation per wave length of the translated wave. Consequently, devices providing for even a small rate of attenuation of either of the field energies separately are subject to undesirable space requirements and excessive expense.

Attempts to minimize reflection in wave guides, for example, by shaping the resistive materials to a form selected to minimize reflection are satisfactory to some degree. However, regardless of the shape of the resistive material, it is difficult to avoid reflection in a limited space such as that within a wave guide. This is because substantial energy dissipation in a limited space requires such large values of energy attenuation per wave length of a translated wave that dissipation of either the electric field energy or the magnetic field energy by itself causes a prohibitive amount of reactive component in the wave impedance presented in the translated wave. Accordingly, in the interest of favorable space requirements, the best approach to this problem appears to be an arrangement which provides for dissipation of the two kinds of reactive components caused by the electric field energy and magnetic field energy dissipations. One such arrangement is a wave guide having incorporated therein an electromagnetic wave energy absorbing material having a composition which will effect dissipation of the reactive components by cancellation of the respective reactive components described above.

A further disadvantage of known types of dummy loads is the fact that the energy absorbing material used in them characteristically does not provide a linear dissipation of energy throughout the load, thus resulting in an uneven distribution of temperature with the consequent formation of "hot spots" and accompanying non-uniform local expansion of material tending to cause local separation of the energy absorbing material from the adjacent wall of the dummy load and arcing in the separated areas between the respective surfaces.

It, therefore, is an object of this invention to provide an electro-magnetic wave energy absorbing material adapted to absorb substantial amounts of wave-signal energy in a relatively small space and having a wave impedance substantially purely resistive.

It is another object of the invention to provide an electromagnetic wave energy absorbing material, adapted to be interposed in a non-dissipative wave propagation path having a predetermined wave impedance, which is capable of absorbing substantial amounts of wave energy, yet has a substantially purely resistive wave impedance equal to that of the non-dissipative wave propagation path.

It is still another object of this invention to provide an energy absorbing material for dummy loads which produces a linear dissipation of energy throughout the load, insuring uniform expansion of this material in order to avoid the tendency characteristic of known materials to expand irregularly due to the formation of local "hot spots" and the attendant increased local expansion, resulting in separation of the material from the dummy load wall and the undesirable arcing which occurs as a result of this separation.

A final object of this invention is the provision of an energy absorbing material for dummy loads characterized by its high resistance to the adverse effects of exposure to extremely high temperatures for extended periods.

Figure 2:
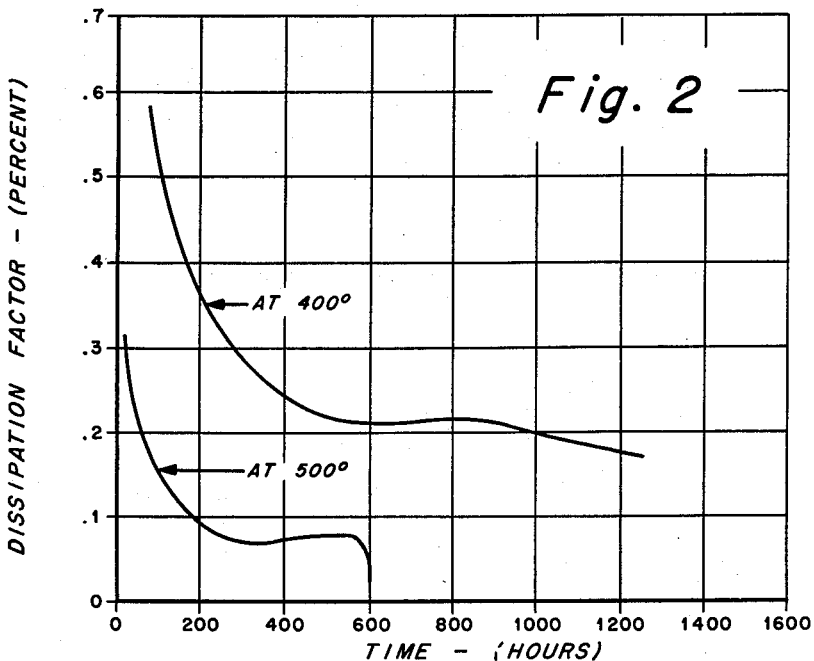
Figure 3:
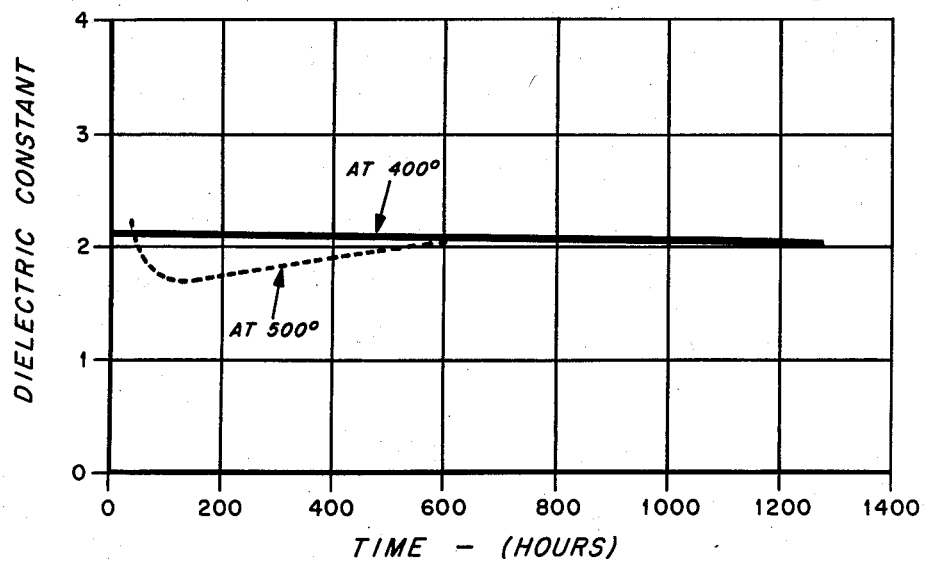
Figure 4:
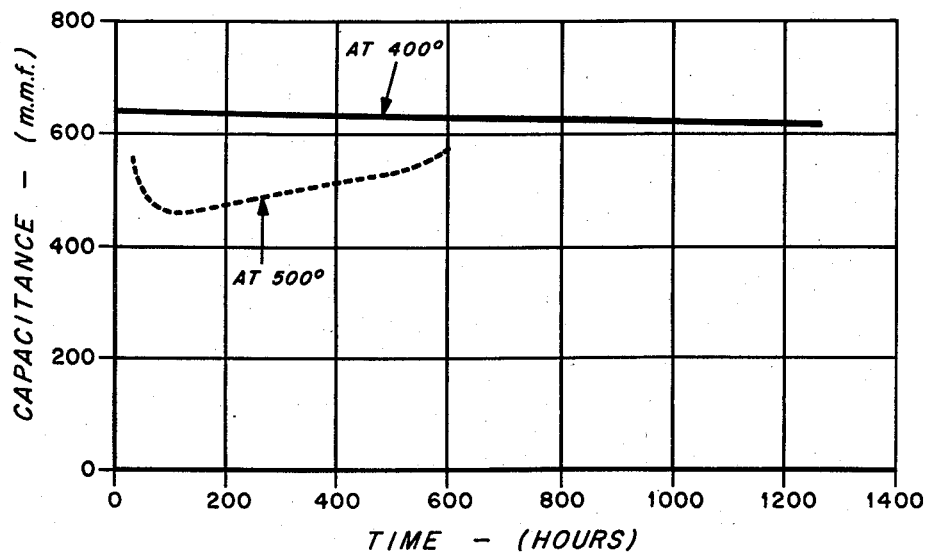

The exact nature of this invention as well as other objects and advantages thereof will be readily apparent from consideration of the following specification and the annexed drawings in which:

Fig. 1 is a graphical representation of the effect of baking time on the dielectric breakdown of silicone films, Fig. 2 is a graphical representation of the effect of baking time on the dissipation factor of silicone films, and Figs. 3 and 4 are graphical representations of the effect of baking time on the dielectric constant and the capacitance, respectively, of silicone films.

In view of the intended use of the material of the instant invention, it is essential that it demonstrate favorable properties under electrical stress, including dielectric breakdown, dissipation factor, and dielectric constant, as well as desirable mechanical properties such as flexibility and adhesion. Moreover, taking into account the relatively high temperature levels attained within a dummy load incorporating this material, due to the attenuation of substantial quantities of wave energy within a closely confined space, it is also essential that the material, and particularly the binder selected therefor, be capable of withstanding high temperatures over extended periods without deterioration of the requisite electrical and mechanical properties enumerated above.

The electromagnetic wave energy absorbing material of this invention comprises an isotropic medium having a high dielectric constant silicone resin binder composed of a polyorganosiloxane such as polymethylsilioxane, for example, into which is incorporated a quantity of particulate conductive material such as iron, aluminum or the like, a quantity of particulate resistive material such as carbon, graphite or the like, and a high dielectric constant material such as powdered barium titanate or other suitable ceramic material.

Considering first the binder, the use of the material disclosed herein as a means of attenuating high frequency waves makes it essential that the substance used as a binder have a relatively high level of dielectric breakdown and a high dissipation factor. Moreover, taking into account the high temperature levels normally sustained in a dummy load, it is also essential that the binder selected for use in the material of the instant invention be capable of withstanding high temperatures over extended periods without deterioration of the critical properties enumerated above. In addition, it is desirable that the binder used demonstrate some flexibility as well as good adhesion under continuing high temperature conditions.

Since all of these requirements are satisfied by certain silicone resins, a material of this type has been specified as the binder in the material of the instant invention. More particularly, the binder may be any polyorganosilioxane, such as polymethylsilioxane $$[(CH_3)SiO_{1.5}]_x.$$

which demonstrates the requisite properties specified above.

A paper by A. H. Saltzman entitled "Effects of Heat on the Electrical and Mechanical Properties of Silicone Films," and dated July 15, 1948, reporting on an investigation dealing with a technique for evaluating various properties of silicone films, discloses the results of a series of different tests conducted at different temperature levels and over various time intervals upon specimens of a typical silicone material of the type specified above, Dow Corning Silicone Resin No. 993. Various significant electrical properties of this particular silicone are clearly indicated by the test results illustrated graphically in Figs. 1 through 4 of this application.

The respective curves in Fig. 1 indicate the variation with time in dielectric breakdown in volts/mil of a thin film of the silicone tested, at temperatures of 300, 400 and 500 degrees Fahrenheit. It will be noted from a comparison of the curves shown that the dielectric breakdown reaches the highest level at 400° and remains substantially unchanged by continued exposure to high temperature after the first 1000 hours.

The two curves in Fig. 2 indicate the variation with time of the dissipation factor in percent at temperatures of 400 and 500 degrees Fahrenheit. In this connection, the dissipation factor can in this case be taken as equal to the power factor, since the power factor, loss angle and dissipation factor are for all practical purposes equal when the values are small. From the showing in Fig. 2 it is apparent that the dissipation factor or power factor reaches a relatively stable minimum value of approximately .2 upon exposure to a 400° temperature and remains substantially unchanged during continued exposure to this high temperature.

The respective curves in Fig. 3 indicate the variation with time of the dielectric constant of the silicone tested, at temperatures of 400 and 500 degrees Fahrenheit, respectively, while the respective curves in Fig. 4 indicate the variation with time of the capacitance of the silicone tested, at temperatures of 400 and 500 degrees Fahrenheit, respectively. With respect to each of these properties, it will be noted that they remain substantially constant over an extended period of more than 1200 hours at 400° while they vary substantially over a relatively shorter period of several hundred hours at 500°.

Thus, from the information based on test results supplied in Figs. 1 through 4 regarding various significant electrical properties of a typical silicone resin, it becomes apparent that these various properties are favorable and remain so over extended periods of exposure to temperatures in the vicinity of 400 degrees Fahrenheit, although at temperatures approaching 500 degrees Fahrenheit the cumulative effect of the various properties on the characteristics of the material becomes less favorable.

The paper referenced above also reported the results of tests to determine the flexibility and adhesion of a typical silicone resin exposed to high temperature. These tests were conducted upon the specimens, consisting of films of silicone resin adhered to copper panels, after they had been used to obtain the test results illustrated graphically in Figs. 1 through 4 by being exposed to the specified temperatures continuously for the extended time intervals indicated. The visually determined results of these latter tests involving predetermined uniform flexure of the various specimen panels indicated that the flexibility of silicone films of the type tested remains good whether the silicone films are heated at 300, 400, or 500 degrees Fahrenheit. However, at 500 degrees and after 575 hours of heating at this temperature, the films showed cracks and did not adhere well to the substrate. Yet, despite this degeneration of the mechanical properties under these conditions, voltage breakdowns of several hundred volts per mil were still obtained when the specimens were tested for dielectric strength.

Considering next the particles of conductive and resistive material, conductive particles of iron, aluminum or other metal and resistive particles of carbon or graphite or the like, all preferably having at least one dimension less than the wavelength of the electromagnetic wave being translated, are used. The individual particles may be of relatively regular shape, but the conductive particles preferably have a plate-like substantially oblong or ellipsoid shape, the long dimension being very large compared to the short dimension, of the order of 5 or 6 to 1. Iron particles of this shape may be purchased or they may be made by dampening particles of relatively uniform dimensions to wetness and processing them in a colloidal mill.

The use of oblong shaped conductive particles in the preferred modification of the instant invention has a number of advantages, as set forth in the above referred to co-pending application, Serial No. 377,745, now U.S. Patent No. 2,837,720, a backing material may be coated with the material of the instant invention in tacky condition and then be suspended so that a major portion of the particles are aligned by surface tension with their long axes substantially parallel. Alternatively, if the particles are of magnetic material their alignment may be accomplished magnetically. This alignment has the advantages that more efficient spatial arrangement is accomplished with the particles closer together and it assures the preferred alignment of the particles in an attenuation element made from the backing material, with respect to electric and magnetic field vectors of the electromagnetic wave being translated. For maximum efficiency in the preferred modification using oblong shaped particles, the particles of magnetic material when incorporated in an attenuation device should be aligned with their long dimensions normal to the vector of the electric field of the translated wave and the resistive particles should be aligned with their long dimensions normal to the vector of the magnetic field.

The additional dielectric material specified above, namely, barium titanate, in a finely powdered form, is uniformly dispersed throughout the mixture. Due to its high dielectric properties, its presence facilitates the attainment of the desired absorbing properties of an element incorporating the material of the instant invention. In addition, the inherent ferroelectric properties of barium titanate are also believed to enhance the energy absorbing properties of the dummy load. Through the use of this compound, most desired ratios of dielectric constant to magnetic permeability are readily obtained for the material. The barium titanate also serves to spread the dissipation of heat uniformly over a greater volume of the dissipation material, thus reducing the possibility of "hot spots" due to an accumulation of power in a small volume, and the consequent variation in the local rate of expansion of the material due to these "hot spots," which results in separation of the material from the surface to which it is attached. In fact, the uniform dissipation of energy in the material characterizing the instant invention and the attendant uniform temperature level throughout this material giving rise to a uniform rate of expansion therefor is enhanced as a contributing factor in assuring a good bond between this material and the surface of a metallic wall in which it is mounted, such as that of a wave guide, by the fact that this material characteristically has a coefficient of expansion substantially the same as that of the metallic wall, particularly when the wall is made of brass which is most commonly used in wave guide construction.

In preparing the material of the instant invention, a mixture is made at room temperature of appropriate quantities of the resistive and conductive particles with the barium titanate and the mixture is then dried. In this connection, it is to be noted that the relative amounts of dielectric material and conductive material are so proportioned with respect to their magnetic permeabilities and dielectric constants as to give a ratio substantially equal to a like ratio of the wave propagation path for the mode of wave propagation. The proportions may be varied to produce various ratios. A purely resistive wave impedance of the energy absorbing material is obtained by proportioning the relative amounts of resistive and conductive material so that equal amounts of magnetic field energy and electric field energy dissipation are obtained, as the two kinds of dissipation tend to cause opposite reactive components in the wave impedance. For the purpose of mixing the material the silicone resin binder may be thinned to the proper consistency by using a solvent such as toluene. For example, the polymethylsiloxane commercially known as Dow Corning Silicone Resin No. 993 may be thinned to the right consistency for mixing by combination with about 30 percent by weight of toluene. Then the silicone resin binder is added to the dried mixture at room temperature and the resulting product is milled in a ball mill to form a suspension of the various particles in the resin. When the energy absorbing material of the instant invention is formed in this manner, the particles of resistive and conductive material and the particles of barium titanate are held in solid suspension and are individually insulated by being separated by minute distances to provide space occupied by the high dielectric silicone resin binder.

As noted above, the proportions of the various components of this material may be varied as necessary to achieve the desired performance characteristics for various applications. However, the percentages of the respective ingredients by weight in relation to the weight of the silicone resin used are 1 to 10 percent iron particles and 12 to 18 percent of carbon particles mixed with 10 to 25 percent of barium titanate for combination with the silicone resin binder. More specifically, satisfactory results have been obtained with a mixture of 1 percent iron particles and 12 percent carbon particles mixed with 25 percent barium titanate and combined with the silicone resin known as Dow Corning Silicone Resin No. 993. However, in view of the substantial variations in the characteristics of materials such as the Dow Corning Silicone Resin No. 993 as between various batches and further variations in these characteristics depending upon the age of the material, the exact proportions of the varying degrees used must presently be determined experimentally for each quantity of such resin used taking into account its condition at the time it is used, pending the possible establishment of more rigid control of the characteristics of this type of resin.

Dummy loads incorporating the material described herein, mixed in the particular proportions indicated above, gave a voltage standing wave ratio of 1.05 or better. In addition, a dummy load containing four cubic inches of the material gave 80 to 100 watts dissipation or about 25 watts per cubic inch. Moreover, the material of the instant invention may be used in various attenuation applications. For example, the material itself may be molded and formed into various shapes or it may be applied as a coating to a surface such as the interior surface of a wave guide. A further application is that disclosed in the above referred to co-pending application Serial No. 377,745, now U.S. Patent No. 2,837,720, in which a laminated element is made for use in wave guides which is constructed of laminae of fiber glass impregnated with this material.

From the above description it is seen that there has been provided a material for use in dummy loads which is capable of absorbing a comparatively large amount of electro-magnetic wave energy in a limited space with good uniform temperature distribution, the material having a substantially pure wave impedance so that it does not reflect wave-signal energy.

Obviously many modifications and variations of the present invention are possible in the light of the above teachings. It is, therefore, to be understood that within the scope of the appended claims the invention may be practiced otherwise than as specifically described.

What is claimed is:

1. A heat resistant electromagnetic wave energy absorbing material capable of uniform energy dissipation over its entire extent for use as a dummy load in a given wave propagation path having a predetermined ratio of magnetic permeability to dielectric constant for a given mode of wave propagation; said energy absorbing material consisting essentially of a silicone resin binder in the amount of substantially 81 percent to substantially 65 percent of the total weight of the wave energy absorbing material, a quantity of finely divided and evenly distributed dielectric material composed of barium titanate in the amount of 10 to 25 percent by weight of said resin mixed with the resin binder; a quantity of highly conductive metallic material incorporated in said dielectric material in the amount of 1 to 10 percent by weight of said resin consisting of particles having at least one dimension small in relation to the wave length of an electromagnetic wave to be translated thereby; the relative quantities of said conductive material and said dielectric material being so proportioned with respect to their magnetic permeabilities and dielectric constants as to provide, for the given mode of wave propagation along the given wave propagation path, a ratio of magnetic permeability to dielectric constant for said energy absorbing material substantially equal to said predetermined ratio; and a substantial quantity of high resistance carbonaceous material incorporated in said dielectric material in the amount of 12 to 18 percent by weight of said resin.

2. An electromagnetic wave energy absorbing material capable of uniform energy dissipation over its entire extent for use as a dummy load in a given wave propagation path having a predetermined ratio of magnetic permeability to dielectric constant for a given mode of wave propagation; said energy absorbing material consisting essentially of a high heat resistant dielectric material including a silicone resin binder in the amount of substantially 81 percent to substantially 65 percent by weight of the total weight of said energy absorbing material combined with finely divided and uniformly distributed barium titanate in the amount of 10 to 25 percent by weight of said resin binder; a quantity of highly conductive metallic material incorporated in said dielectric material in the amount of 1 to 10 percent by weight of said resin binder consisting of particles having at least one dimension small in relation to the wave length of an electromagnetic wave to be translated thereby; the relative quantities of said conductive material and said dielectric material being so proportioned with respect to their magnetic permeabilities and dielectric constants as to provide, for the given mode of wave propagation along the given wave propagation path, a ratio of magnetic permeability to dielectric constant for said energy absorbing material substantially equal to said predetermined ratio; and a substantial quantity of high resistance carbonaceous material in the amount of 12 to 18 percent by weight of said resin binder consisting of particles having at least one dimension small in relation to the wave length of an electromagnetic wave to be translated thereby; the relative quantities of resistive and conductive material being so proportioned that equal amounts of magnetic field energy and electric field energy dissipation are obtained in order to obtain a purely resistive wave impedance of said energy absorbing material.

3. An electromagnetic wave energy absorbing material characterized by uniform energy absorption in all portions thereof for use as a dummy load in a given wave propagation path having a predetermined ratio of magnetic permeability to dielectric constant for a given mode of wave propagation; said energy absorbing material consisting essentially of a quantity of dielectric material including a high heat resistant silicone resin binder in the amount of substantially 81 percent to substantially 65 percent by weight of said electromagnetic wave energy absorbing material and barium titanate uniformly dispersed throughout said silicone resin binder in the amount of 10 to 25 percent by weight of said resin binder; a quantity of highly conductive metallic material of individually insulated particles with maximum dimensions small in relation to the wave length of the electromagnetic wave to be translated thereby dispersed in said dielectric material in the amount of 1 to 10 percent by weight of said resin binder and effective to cause dissipation of the magnetic energy of said translated wave; the relative amounts of said materials being so proportioned as to give a ratio of effective magnetic permeability to effective dielectric constant for said energy absorbing material substantially equal to said predetermined ratio of magnetic permeability to dielectric constant for the given mode of wave propagation along the given wave propagation path; and a substantial quantity of highly resistive carbonaceous material of individually insulated particles having maximum dimensions small in relation to the wave length of said translated wave dispersed in said dielectric material in the amount of 12 to 18 percent by weight of said resin binder and effective to cause dissipation of the electric energy of said translated wave.

4. An electromagnetic wave energy absorbing material characterized by uniform energy absorption in all portions thereof and by purely resistive wave impedance for use as a dummy load in a given wave propagation path having a predetermined ratio of magnetic permeability to dielectric constant for a given mode of wave propagation; said energy absorbing material consisting essentially of a quantity of dielectric material including a high heat resistant silicone resin binder in the amount of substantially 73.5 percent by weight of said electromagnetic wave energy absorbing material and finely divided barium titanate uniformly dispersed throughout said silicone resin binder in the amount of substantially 25 percent by weight of said resin binder; a quantity of highly conductive material of individually insulated iron particles with maximum dimensions small in relation to the wave length of the electromagnetic wave to be translated thereby dispersed in said dielectric material in the amount of substantially 1 percent by weight of said resin binder and effective to cause dissipation of the magnetic energy of said translated wave; the relative amounts of said materials being so proportioned as to give a ratio of effective magnetic permeability to effective dielectric constant for said energy absorbing material substantially equal to said predetermined ratio of magnetic permeability to dielectric constant for the given mode of wave propagation along the given wave propagation path; and a substantial quantity of highly resistive material consisting of individually insulated carbon particles having maximum dimensions small in relation to the wave length of said translated wave dispersed in said dielectric material in the amount of substantially 12 percent by weight of said resin binder and effective to cause dissipation of the electric energy of said translated wave; the relative quantities of said conductive material and said resistive material being proportioned to cause substantially equal dissipation of the magnetic field energy and the electric field energy of the translated electromagnetic wave.

References Cited in the file of this patent

UNITED STATES PATENTS

| | | |
|---|---|---|
| 2,277,736 | Wainer | Mar. 31, 1942 |
| 2,526,059 | Zabel et al. | Oct. 17, 1950 |
| 2,579,327 | Lund | Dec. 18, 1951 |
| 2,610,250 | Wheeler | Sept. 9, 1952 |
| 2,658,833 | Coffeen et al. | Nov. 10, 1953 |
| 2,730,597 | Podolsky | Jan. 10, 1956 |